Nov. 16, 1954    E. F. PECK    2,694,469
DASHPOT FOR WEIGHING SCALES AND THE LIKE
Filed May 7, 1951
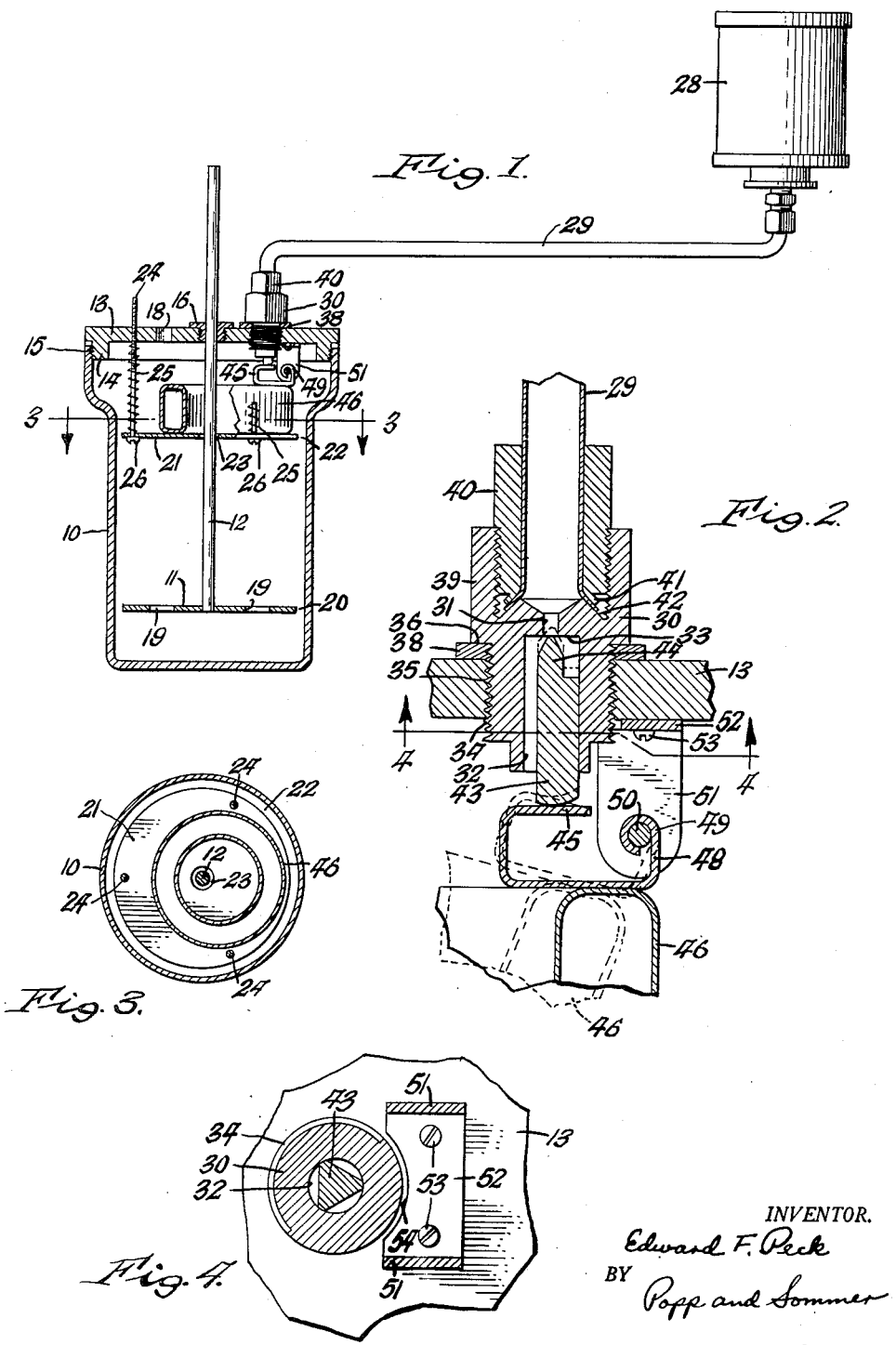
INVENTOR.
Edward F. Peck
BY
Popp and Sommer
ATTORNEYS.

United States Patent Office 2,694,469
Patented Nov. 16, 1954

2,694,469

DASHPOT FOR WEIGHING SCALES AND THE LIKE

Edward F. Peck, Buffalo, N. Y.

Application May 7, 1951, Serial No. 224,995

5 Claims. (Cl. 188—96)

This invention relates to improvements in a dashpot for damping the oscillations of movable parts in weighing scales and the like so as to bring the scale mechanism to a correct reading promptly.

As customarily constructed such a dashpot comprised a covered cylinder mounted on some stationary part of the scale and containing a liquid such as oil, a plunger movably arranged in the cylinder, and a piston rod connected to the plunger and extending through the cylinder cover and connected to some movable part of the scale mechanism. Sudden movement of the scale parts, as normally occurring when an appreciable load was placed on or removed from the platform of the scale, caused the liquid to surge past the plunger. This resulted in some of the liquid escaping through a liquid filling hole usually provided in the cylinder cover or through the opening therein through which the piston rod extended. The net result was that the quantity of liquid in the cylinder gradually diminished over a period of time through being lost in small amounts as above described and by evaporation. The cylinder covers of some prior art dashpots were dished to trap the liquid that escaped. Even if allowed to drain back into the cylinder the liquid would pick up foreign matter and become dirty and gummy. Needless to say such arrangements were inefficient, untidy and required frequent servicing. Experience has showed that the greater portion of service costs were merely oil refilling jobs but these were annoying and time consuming because the dash pot was usually arranged inside the housing of the scale so that a considerable disassembling of parts was necessary to provide access to the dashpot. Of course, after the dash pot was serviced, the removed parts had to be reassembled.

It is accordingly the principal object of the present invention to provide a dash pot which is automatically replenished with liquid so as to maintain the body of liquid in the cylinder of the dash pot at a predetermined level.

Another object is to provide such a dash pot in which the surging effect of the liquid due to rapid movements of the plunger is suppressed.

Another object is to provide such a dash pot which is not likely to get out of order or require repairs, but if some maintenance is necessary the dash pot can be readily disassembled for such purpose.

A further object is to provide such a dash pot which is simple in construction and inexpensive to manufacture.

Other objects and advantages will be apparent from the following description and accompanying drawing in which:

Fig. 1 is a vertical central sectional view of a dash pot, with some associated parts illustrated in elevation, embodying the invention and showing the position of certain parts during replenishment of fluid in the cylinder of the dash pot.

Fig. 2 is a fragmentary vertical sectional view, on an enlarged scale, of the float valve shown in Fig. 1.

Fig. 3 is a horizontal sectional view taken on line 3—3, Fig. 1.

Fig. 4 is a horizontal sectional view taken on line 4—4, Fig. 2.

The dash pot is shown as a cylindrical cup-shaped housing 10 arranged with its axis vertically so that its closed end is at the bottom and its open end or mouth is at the top. The lower portion of the housing 10 is shown as being of uniform diameter for the major portion of its height to provide a cylinder in which a plunger or piston 11 mounted on the lower end of a piston rod 12 works. The upper mouth portion of the housing 10 is also shown as cylindrical in cross-section but of larger diameter than the lower working cylinder portion of the housing.

An end head or cover 13 is removably arranged on the upper end of the housing 10. This cover 13 is in the form of a flat disk having an annular flange 14 depending from its under side and set back from the rim of the disk to provide a downwardly facing marginal shoulder adapted to seat against the upper edge of the housing 10. The periphery of the annular flange 14 preferably has a threaded connection with the housing as indicated at 15.

The cover 13 is centrally provided with a threaded hole to receive a bushing 16 in the bore of which the piston rod 12 is arranged to slide with a minimum of friction. The bushing 16 guides the piston rod 12 during the latter's reciprocation. A vent hole 18 is shown as provided in the cover 13 to one side of the bushing 16.

The plunger 11 may be of any suitable construction. As shown, it is in the form of a disk having a series of openings 19 therethrough arranged annularly around the piston rod 12. The diameter of the plunger 11 is slightly less than the internal diameter of the lower cylindrical portion of the housing 10 so as to provide an annular narrow space or clearance 20 therebetween.

As is customary with dash pots of this general type, the upper end of the piston rod 12 is connected to some vertically moving part of the scale mechanism (not shown) and the purpose of the dash pot is to rapidly dampen the oscillatory movement of such part so that a final weight is quickly indicated. Since the housing 10 contains a body of fluid such as oil or other suitable liquid, it will be seen that any movement of the movable part of the scale mechanism to which the piston rod 12 is connected will move the plunger 11 axially of the housing 10 through the body of the liquid therein. During such movement of the plunger 11 in either direction the liquid is throttled through the holes 19 in the plunger and the annular clearance 20 therearound and this throttling operates to yieldingly oppose or cushion the oscillations of the moving part of the scale mechanism.

It will be seen and experience has proved that if the plunger 11 is forcefully pulled upwardly the liquid in the housing 10 above the plunger will surge so as to squirt or splash some of the liquid out the vent hole 18. If this condition obtained for a period of time, even of relatively short duration, enough liquid would have escaped through the vent hole 18 to lower the level of the liquid in the housing 10 below the upper end of the normal working stroke of the plunger 11 and thereby impair the proper functioning of the dash pot.

The present invention is directed to correcting the aforementioned defects by suppressing the surge effect produced by rapid movement of the plunger 11 in the housing 10 and minimizing the amount of liquid, if any, escaping through the vent hole 18 and also by automatically replenishing the body of liquid in the housing to make up for liquid lost by escape or evaporation so that a predetermined level of liquid is maintained in the housing at all times and a great amount of servicing of scales equipped with dash pots of this general type is eliminated.

To carry out these objectives, a baffle 21 is arranged in the housing 10 above the upper end of the normal stroke of the plunger 11 and below the normal level of liquid maintained in the housing. The submerged baffle 21 is preferably in the form of a flat plate or disk as shown arranged horizontally transversely of the housing 10 adjacent the upper end of the lower cylindrical portion of the housing. The baffle plate 21 is smaller in diameter than the surrounding wall of the housing 10 to provide an annular space or clearance 22. The piston rod 12 extends through a slightly enlarged hole 23 provided centrally in baffle plate 21.

While any suitable means may be employed for supporting the baffle plate 21, those shown have been found to be simple, inexpensive and adjustable to permit of varying the vertical position of the baffle, if desired. Accordingly, the baffle plate 21 is shown as suspended from the cover 13 by being hung on three elongated screws 24 which screw into threaded holes provided in the cover. A helical compression spring 25 surrounds the shank of each screw 24 and the upper end of the spring bears against the bottom or inner surface of the cover 13 while the lower end of the spring bears against the upper surface of the baffle plate 21 and presses the same against the upwardly facing shoulder of the respective screw head 26.

Also in accordance with the invention, means are provided for automatically maintaining the liquid level in the housing 10. Such means are shown as comprising a liquid reservoir and a float valve connecting the same with the interior of the housing 10 for controlling the admission of liquid. The liquid reservoir may be a container of any suitable construction or form and capacity such as the oil cup 28 shown. The reservoir or oil cup 28 is arranged above the housing 10 at any suitable location and is suitably mounted on some stationary part of the scale. A supply tube or line 29 at one end is suitably connected to the bottom of the reservoir or oil cup 28 and at its other end is connected to the float valve mounted on the cover 13 for the dash pot housing 10.

The float valve comprises a body 30 having a vertical passage extending completely therethrough, said passage having a restricted upper part 31 and an enlarged cylindrical lower part 32 to provide a downwardly facing internal shoulder or valve seat 33 therebetween. The lower portion of the body 30 is provided with external threads 34 to permit the body to be screwed into a threaded hole 35 provided in the cover 13. Above the upper end of the threads 34, the body 30 is enlarged to provide a downwardly facing shoulder 36 adapted to engage a gasket or washer 38 and clamp the same against the upper surface of the cover 13. An internally threaded enlarged sleeve portion 39 extends upwardly from the shoulder 36 on the body 30 and receives an externally threaded follower or clamping nut 40. The supply tube or line 29 extends through the bore of the follower or clamping nut 40 and has its extremity or mouth 41 flared outwardly against the conical lower end on the follower or clamping nut. On its other side the flared mouth 41 engages a complementary conical seat 42 formed on the body 30. It will thus be seen that by tightening the follower or clamping nut 40 the flared mouth 41 of the supply tube 29 is firmly clamped and thereby connected to the valve body 30.

A valve plunger 43 is vertically slidably arranged in the lower part 32 of the passage in the valve body 30. As shown in Fig. 4, this valve plunger 43 is generally triangular in cross-section with the apexes of the plunger slidingly engaging the walls of the passage 32 so that this passage is not completely blocked. The upper end of the valve plunger 43 is formed with a central upstanding cylindrical head 44 and the upper end of this head is tapered and rounded so as to be partially insertable into the upper part 31 of the passage in the valve body 30 and engage the inner rim of the seat or shoulder 44.

The lower end of the valve plunger 43 is at all times supported on an arm 45 mounted on the top of a hollow annular float 46 at one side thereof. The float 46 surrounds the piston rod 12 and the hole 23 therefor in the baffle plate 21 and is arranged immediately above this baffle plate. The float 46 is mounted for pivotal movement about a horizontal axis and for this purpose a pivot arm 48 extending upwardly from the float and having its upper end bent into the form of an eye 49 to receive a horizontally arranged pivot pin 50, is provided. The valve plunger arm 43 and pivot arm 48 are preferably formed of a single piece of sheet metal bent into suitable shape and which is welded or brazed to the float 46, as shown. The opposite ends of the pivot pin 50 are mounted in the lower ends of the depending legs 51—51 of a U-shaped bracket, the cross part 52 of which is held against the bottom surface of the cover 13 as by a pair of screws 53—53. The side of the cross part 52 adjacent the valve body 30 is cut out as indicated at 54 so that the bracket is arranged close to the valve body.

The level of the liquid in the housing 10 determines the position of the float 46 in its pivotal movement about the pivot pin 50 with the extremes of movement being determined by the fully closed position of the float valve in one direction and by the engagement of the float with the baffle plate 21 in the other direction, the latter hence being the maximum permitted open or fully open position. The fully closed position of the float valve is illustrated by broken lines in Fig. 2. In this position the head 44 of the valve plunger 43 is seated closing off the lower end of the part 31 of the passage in the valve body 30, the plunger being elevated to the position by the arm 45 on the float 46 which has been tilted upwardly about its pivot pin 50. This closed position of the float valve is determinative of the normal level of liquid to be maintained within the housing 10. However, should the level drop for the various reasons previously discussed, the float 46 swings downwardly about the pivot pin 50. This lowers the arm 45 and the valve plunger 43 moves downwardly by gravity as well as being forced downwardly by the pressure of the liquid in the line 29 so as to maintain contact with the arm 45. Such lowering of the valve plunger 43 opens the valve and permits liquid to flow into the housing 10 to raise the level of the liquid therein until the valve is again closed by the float action. The make up liquid is derived from the reservoir 28 which is suitably vented to provide a gravity flow of liquid in the line 29 toward the housing 10. The maximum position to which the valve can be opened is illustrated by full lines in Fig. 2 and the position of the float 46 shown in Fig. 1. In this position it will be noted that float 46 strikes the baffle plate 21 when the former is in about a horizontal position and this engagement prevents further lowering of the float.

It has been found that the baffle plate 21 not only prevents the undesirable splashing or squirting of liquid out the vent hole 18 but also the disposition of the baffle plate immediately under the float 46 protects the float against subjection to surges and eddy currents which would needlessly operate the float valve if the baffle plate were omitted. Thus the baffle plate 21 serves to confine substantially the liquid in the working cylinder portion of the housing 10 below the baffle plate 21 and even if liquid passes through the annular space 22 around the baffle plate and also through the space of the enlarged hole 23 therein unoccupied by the cross section of the piston rod 12, the liquid is not impacted against any part of the float 46 since no part of the float body itself extends horizontally outwardly beyond the inner and outer rims of the baffle plate into the flow streams of the liquid passing through the openings 22 and 23.

From the foregoing it will be seen that the present invention provides an improved dash pot for weighing scales and the like which reduces the loss of liquid used in the dash pot and supplies itself automatically with any make up liquid needed and which accomplishes these objectives by simple, durable and inexpensive means. The invention also avoids the frequent servicing required for dash pots of this general type required in the past.

I claim:

1. A dash pot of the character described, comprising a housing containing a body of liquid, a plunger, a rod connected to said plunger and movable through an opening in the upper end of said housing, baffle means submerged in said liquid body and arranged above the upper end of the working stroke of said plunger and being so constructed that liquid flow is restricted between the portions of said housing above and below said baffle means, and means arranged to supply additional liquid to said housing to maintain said liquid body therein at a normal predetermined level above said baffle means, said last means comprising a float valve, a reservoir of liquid connected with said valve and a float for actuating said valve and supported on said liquid body above said baffle means and being so constructed and arranged that no part of said float obstructs the flow paths between said portions of said housing.

2. A dash pot of the character described, comprising a housing containing a body of liquid, a plunger, a rod connected to said plunger and movable through an opening in the upper end of said housing, a baffle plate submerged in said liquid body and arranged above the upper end of the working stroke of said plunger and being so constructed that liquid flow is restricted between the portions of said housing above and below said baffle plate, and means arranged to supply additional liquid to said housing to maintain said liquid body therein at a normal predetermined level, said means comprising a float valve, a reservoir of liquid connected with said valve and a float for actuating said valve and supported on said liquid body above said baffle means, the relative disposition of said float and baffle plate being such that the latter serves as a stop for the former and such engagement thereby determining the fully open position of said valve.

3. A dash pot of the character described, comprising a housing containing a body of liquid, a plunger, a rod connected to said plunger and movable through an opening in the upper end of said housing, a baffle plate submerged in said liquid body and arranged above the upper end of the working stroke of said plunger and being so constructed that liquid flow is restricted between the portions of said housing above and below said baffle plate, means suspending said baffle plate from said upper end of said housing and comprising a series of spaced elongated screws having their shanks extending through holes in said baffle plate and screwed into threaded holes in said upper end of said housing and having their heads arranged below and engaging the lower surface of said baffle plate and supporting the same and a helical compression spring surrounding the shank of each screw and pressing said baffle plate against said screw heads, and means including a float valve arranged above said baffle plate to supply additional liquid to said housing to maintain said liquid body therein at a normal predetermined level.

4. A dash pot of the character described, comprising a cup-shaped housing containing a body of liquid, a removable cover for said housing, a plunger vertically movable in said liquid body, a rod connected to said plunger and movable through an opening in said cover, a baffle plate submerged in said liquid body and arranged across said housing above the upper end of the working stroke of said plunger and being so constructed that liquid flow is restricted between the portions of said housing above and below said baffle plate, means suspending said baffle plate from said cover, and means arranged to supply additional liquid to said housing to maintain said liquid body therein at a normal predetermined level, said last means comprising a float valve having a valve body mounted on said cover and a valve plunger adapted to seat on a downwardly facing seat, a reservoir of liquid arranged exteriorly of said housing and connected with said valve body and a float arranged above said baffle plate and contacting said liquid body and pivoted to said cover and movably supporting said valve plunger.

5. A dash pot of the character described, comprising a cup-shaped housing containing a body of liquid, a removable cover for said housing, a plunger vertically movable in said liquid body, a rod connected to said plunger and movable through an opening in said cover, a baffle plate submerged in said liquid body and arranged across said housing above the upper end of the working stroke of said plunger, said baffle plate having an enlarged opening through which said rod extends and also having its outer edge arranged in closely spaced relation to the surrounding wall of said housing thereby to provide apertures which restrict the flow of liquid between the portions of said housing above and below said baffle plate, means suspending said baffle plate from said cover, and means arranged to supply additional liquid to said housing to maintain said liquid body therein at a normal predetermined level, said last means comprising a float valve having a valve body mounted on said cover, a valve plunger adapted to seat on a downwardly facing seat and a float contacting said liquid body and movably supporting said valve plunger, said float being annular in shape and surrounding said rod and being arranged immediately above said baffle plates so that no part of said float covers said apertures, means mounting said float on said cover for pivotal movement about a horizontal axis arranged to one side of said valve plunger, and a reservoir of liquid arranged exteriorly of said housing to supply liquid to said valve body.

References Cited in the file of this patent

UNITED STATES PATENTS

| Number | Name | Date |
|---|---|---|
| 1,775,349 | Kaun | Sept. 9, 1930 |
| 1,821,988 | Rowles | Sept. 8, 1931 |
| 1,846,205 | Johnson | Feb. 23, 1932 |
| 1,909,582 | Hopkinson et al. | May 16, 1933 |
| 2,179,750 | McCracken | Nov. 14, 1939 |
| 2,195,867 | Mallory | Apr. 2, 1940 |
| 2,284,354 | Acly | May 26, 1942 |

FOREIGN PATENTS

| Number | Country | Date |
|---|---|---|
| 705,635 | Germany | May 5, 1941 |